United States Patent
Carroll (10) Patent No.: US 12,545,515 B1
(45) Date of Patent: Feb. 10, 2026

(54) STEREO STRUCTURED LIGHT MACHINE VISION SYSTEM FOR GUIDANCE OF AUTOMATED TOTE EXCHANGE EQUIPMENT

(71) Applicant: Amazon Technologies, Inc., Seattle, WA (US)

(72) Inventor: Tait Stephen Carroll, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 429 days.

(21) Appl. No.: 18/208,793

(22) Filed: Jun. 12, 2023

(51) Int. Cl.
  *B65G 1/137* (2006.01)
  *B25J 9/16* (2006.01)
  *B25J 19/02* (2006.01)
  *G06T 7/70* (2017.01)

(52) U.S. Cl.
  CPC .......... *B65G 1/1373* (2013.01); *B25J 9/1697* (2013.01); *B25J 19/021* (2013.01); *G06T 7/70* (2017.01); *G06T 2207/10012* (2013.01)

(58) Field of Classification Search
  CPC ................ B65G 1/1373; G06T 7/70; G06T 2207/10012; B25J 9/1697; B25J 9/021
  See application file for complete search history.

(56) References Cited

U.S. PATENT DOCUMENTS

| | | | |
|---|---|---|---|
| 8,280,547 B2 | 10/2012 | D'Andrea et al. | |
| 12,062,013 B1 * | 8/2024 | Zhu | G06F 16/23 |
| 12,427,656 B2 * | 9/2025 | Prechtl | B25J 15/0616 |
| 2012/0143427 A1 | 6/2012 | Hoffman et al. | |
| 2018/0005035 A1 * | 1/2018 | Bogolea | G06V 20/20 |
| 2021/0003391 A1 * | 1/2021 | Tsuji | G01B 11/24 |
| 2021/0374836 A1 * | 12/2021 | Bronicki | G06Q 30/0208 |
| 2022/0343524 A1 * | 10/2022 | Kyu | G06T 7/73 |
| 2024/0112459 A1 * | 4/2024 | Hoso | G06V 10/98 |
| 2024/0308081 A1 * | 9/2024 | Ando | B25J 9/1697 |

OTHER PUBLICATIONS

U.S. Appl. No. 18/374,773, Patent Application, "Automated Calibration of a Machine Vision System", filed Sep. 29, 2023. 39 pages.

* cited by examiner

*Primary Examiner* — Kyle O Logan
(74) *Attorney, Agent, or Firm* — Kilpatrick Townsend & Stockton LLP

(57) ABSTRACT

Inventory systems may include an inventory holder, a transfer apparatus, and a stereo vision system localized to determine a three dimensional (3D) pose of the inventory holder. The stereo vision system includes a first camera and a first laser disposed at a first end portion of a platform, and a second camera and a second laser disposed at a second end portion of the platform. The first camera and the first laser being localized to capture a first image of a first frame portion of an opening of the inventory holder. The second camera and the second laser being localized to capture a second image of a second frame portion of the opening. Furthermore, one or more processors can be configured to determine the 3D pose of the inventory holder based on the first image and the second image.

20 Claims, 8 Drawing Sheets

STEREO STRUCTURED LIGHT MACHINE VISION SYSTEM FOR GUIDANCE OF AUTOMATED TOTE EXCHANGE EQUIPMENT

BACKGROUND

Inventory systems, such as those in warehouses, supply chain distribution centers, airport luggage systems, and custom-order manufacturing facilities, face significant challenges in storing inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. Additionally, expanding or reducing the size or capabilities of many inventory systems requires significant changes to existing infrastructure and equipment. As a result, the cost of incremental changes to capacity or functionality may be prohibitively expensive, limiting the ability of the system to accommodate fluctuations in system throughput.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS", the entire disclosures of which are herein incorporated by reference. Specifically, features herein are directed to detecting the position of objects relative to inventory holders so as to facilitate various functions of the inventory system. To this end, the inventory system can include stereo vision system for capturing localized images of a portion of the inventory holder and further determine three dimensional (3D) poses e.g., spatial positions of the inventory holder.

In accordance with an embodiment, an inventory station can include a stereo vision system for determining a 3D pose of the inventory holder. The inventory holder is typically transported by a mobile drive unit and positioned at an item transfer in a specified orientation. However, operating tolerances for the mobile drive unit and/or other factors may cause the orientation of the inventory holder to be slightly offset from the specified orientation with respect to an item transfer apparatus. This may affect the item transfer to or from the inventory holder when interacting with the transfer apparatus. For example, the item may be not properly inserted within the inventory holder, or it may be difficult to extract an item due to interference with a frame of the inventory holder. Hence, determining a three dimensional (3D) pose of the inventory holder within a 3D space can advantageously provide smooth and efficient interaction with the transfer apparatus 200 during an item transfer.

In accordance with an embodiment, the stereo vision system can include multiple cameras and lasers coordinated to capture localized information of the inventory holder during item transfer. Based on the captured information, the 3D pose of the inventory holder can be determined. For example, a first camera and a first laser can cooperatively capture a first image (e.g., a leftward image) localized to a first frame portion (e.g., a leftward portion) associated with a specified compartment of the inventory holder. A second camera and a second laser can cooperatively capture a second image (e.g., a rightward image) localized to a second frame portion (e.g., a rightward portion) associated with the specified compartment. One or more processors can be configured to determine the 3D pose of the inventory holder based on the first image and the second image.

In some embodiments, images can include one or more laser line profiles created by light of the lasers intersecting frame portions of the specified compartment. Based on a first laser line profile in the first image, a first location on a vertical portion and a second location on a horizontal portion of the first frame portion (e.g., the leftward portion) can be determined. Similarly, based on a second laser line profile, a third location on a horizontal portion and a fourth location on a vertical portion of the second frame portion (e.g., the rightward portion) can be determined. Based on the first location, the second location, the third location, and (optionally) the fourth location, the one or more processors can be configured to determine the 3D pose of the inventory holder.

Advantageously, the stereo vision system can be mounted on a head or a cross-beam of a transfer apparatus used for transferring items to/from the inventory holders. The head of the transfer apparatus can be positioned to a specified compartment of the inventory holder. This way, the stereo vision camera is also in a position to capture orientation-related information associated with the specified compartment. As such, extra movements of the head of the transfer apparatus may be avoided. Furthermore, the processor may be configured to determine orientation of the inventory holder based on few points extracted from an image captured by the cameras. Processing time to determine a 3D pose based on few points can be significantly faster compared to processing an entire image of an inventory holder. The 3D pose information can be used to accurately measure an arrival pose of the inventory holders. This eliminates the need for the inventory holder to arrive in a specific accurate pose which reduces cost of the inventory holders and mobile drive units used to transport the inventory holders, as well as increases the storage density efficiency of the inventory holders by allowing less clearance between the walls of the inventory holders and the item stored in the holder.

Figure 1:
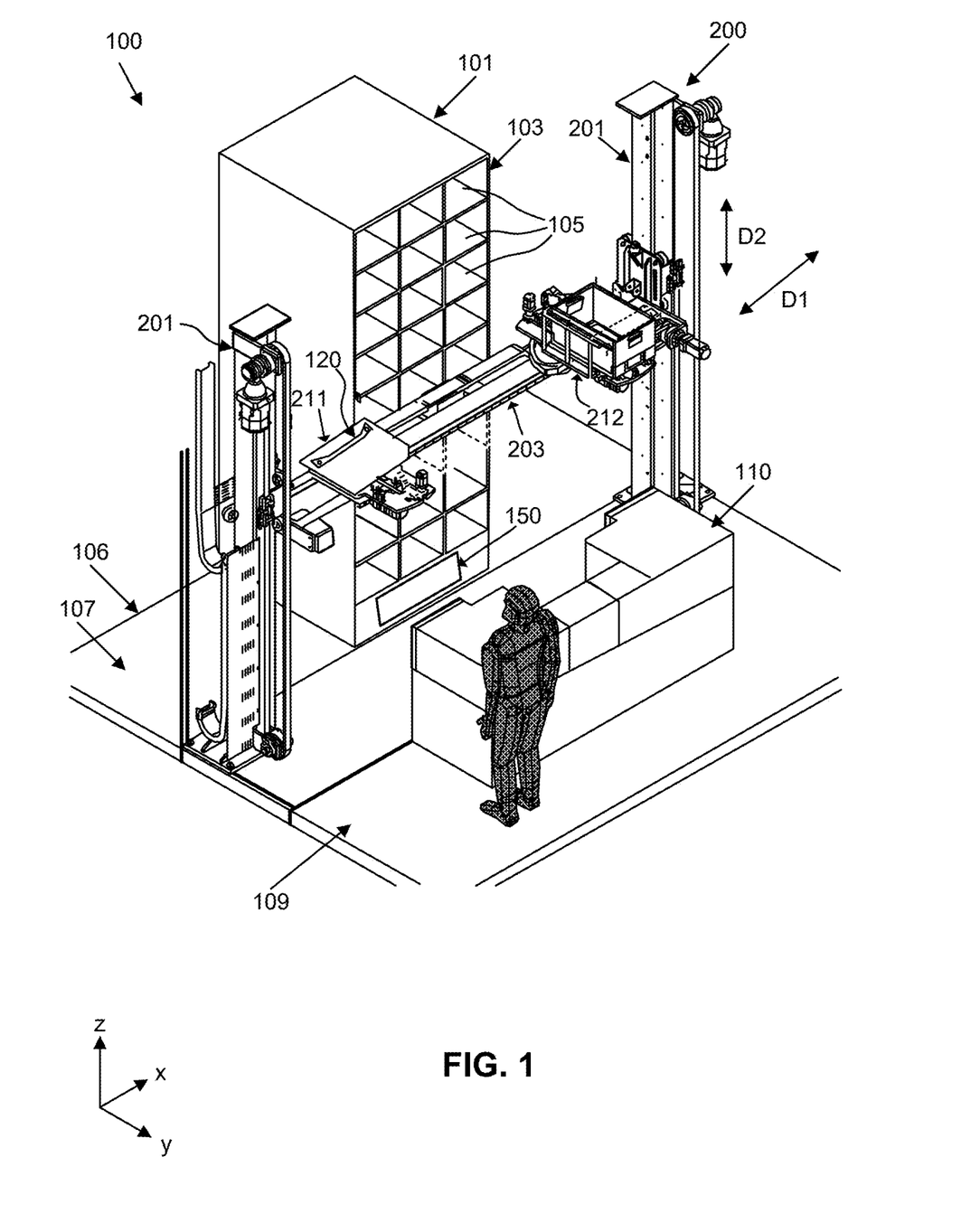
FIG. 1 illustrates example components of an example inventory system according to a various embodiment.

Referring now to the drawings, in which similar identifiers refer to similar elements, FIG. 1 illustrates a perspective view of an example of an inventory system 100, according to various embodiments. In the illustrated embodiment of FIG. 1, the inventory system 100 can include one or more inventory holders 101, a workstation 110, a transfer apparatus 200 within a workspace 106, and a stereo vision system 120 positioned on the transfer apparatus 200. In FIG. 1, one inventory holder 101, one transfer apparatus 200, and one vision system 120 are shown for illustration purposes without limiting the scope of the present disclosure. The inventory system 100 can move inventory items between one or more inventory holders 101 and the workstation 110. For example, the inventory system 100 can facilitate the entry, processing, and/or removal of inventory items from the inventory system 100 and the completion of other tasks involving the inventory items. In various embodiments, the workspace 106 can represent a portion of or all of the floor of a warehouse environment in which the inventory system 100 operates.

The inventory holder 101 of the inventory system 100 may operate within a first space 107 (e.g., moved by a mobile drive unit 150, for example), the operators can work in a second space 109 where the workstation 110 is located, and the transfer apparatus 200 can be operated in a third space between the first space 107 and the second space 109. The mobile drive unit 150 can transport the inventory holder 101 to a specified location in a specified orientation. However, operating tolerances for the mobile drive unit and/or other factors may cause the orientation of the inventory holder 101 to be slightly offset with respect to the transfer apparatus 200. Hence, determining a three dimensional (3D) pose of the inventory holder 101 within a 3D space can advantageously provide smooth and efficient interaction with the transfer apparatus 200 during an item transfer.

In many embodiments, the inventory holder 101 can include a plurality of compartments 105 defined by a frame 103. For example, the frame 103 can be include vertical and horizontal frame elements spaced from each other and coupled to form rows and columns. The spacing between two adjacent horizontal frame elements and two adjacent vertical frame elements can define a compartment. Each of the compartments 105 has an opening to allow access to space within the compartment or items therein. Each opening of the compartment 105 allows insertion or removal of an item via the transfer apparatus 200. In some embodiments, for item transfer, the mobile drive unit 150 can position the inventory holder 101 in front of the transfer apparatus 200 and orient the inventory holder 101 such that each of the compartments 105 can be accessed by a head of the transfer apparatus 200.

As shown, the compartments 105 can be arranged in rows and columns. The compartments 105 can have different locations and orientations (e.g., angular orientation) in the 3D space. For example, the compartments 105 can be at different heights or vertical locations and different horizontal locations. In many embodiments, a location in 3D space can be characterized by x, y, and z coordinates and/or rotational orientations about the x, y, and z axis. A 3D pose (e.g., orientation in a 3D space) of the inventory holder 101 can affect the location (e.g., the x, y, z coordinates) and orientation of each of the compartments 105. As a result, while inserting or extracting of an item to/from a compartment 105 the item may interfere along a depth (e.g., along the y-axis depicted) of the compartment 105. Determining the 3D pose of the inventory holder 101 or the compartment 105 can be advantageous for proper alignment between item transferring entities (e.g., transfer apparatus, item, inventory holder).

In many embodiments, the 3D pose can be determined based on localized information associated with a specified compartment 105 during an item transfer process therein. For example, the present disclosure provides a stereo vision system that can be positioned on a transfer apparatus and configured to determine a 3D pose of an inventory holder and/or localized information related to a compartment.

The transfer apparatus 200 includes an upright frame 201, a lateral frame 203, and a head 211. The head 211 can be configured for item transfer to/from an inventory holder. The head 211 can be rotated and/or translated to align an item or item exchange mechanism with an opening of a specified compartment (e.g., 105) of an inventory holder. The head 211 can be vertically aligned by moving the lateral frame 203 along the upright frame 201 or horizontally aligned by moving the head 211 along the lateral frame 203. In addition or alternatively, a second head 212, which can be same as the head 211, may be provided. The lateral frame 203 of the transfer apparatus can support the head 211. The lateral frame 203 may extend between the upright portions of the frame 201 to guide movement of the head 201 in or along a first direction D1 (e.g., a horizontal direction or x-axis). The upright frame 201 may be arranged to guide and support movement of the lateral frame 203 in or along a second direction D2 (e.g., a vertical direction or z-axis). The head 211 can rotate about an axis (e.g., z-axis) perpendicular to the lateral frame 203 and translate along the lateral frame 203 in the first direction D1. This rotation and translation movement can be performed independently or simultaneously. Additionally, the head 211 can also include an extractor extendible in or along a third direction (e.g., y-direction) to extract or deliver items in or along a third direction (e.g., y-direction).

In many embodiments, the stereo vision system 120 can be provided on the head 211 of the transfer apparatus 200. The stereo vision system 120 can be positioned to face a specified compartment 105 of the inventory holder 101, such as by moving the head 211 along the x-axis and the z-axis. This way, the stereo vision system 120 can be localized to a particular portion (e.g., a specified compartment 105) of the inventory holder 101 to capture information local to that particular portion (e.g., the specified compartment 105). Based on the captured localized information, a 3D pose of the inventory holder 101 and/or the compartment 105 can be determined. In some embodiments, a 3D pose can be characterized by a level between two points of a frame portion, depth between two points of the same frame portion, an angular orientation of the frame portion, coordinate information of multiple points on the frame portion, or other geometric properties. Further, the 3D pose information can be used to accurately align the head 211 with the inventory holder 101. Upon alignment, an item can be extracted or inserted in the inventory holder 101 with negligible interference with the inventory holder 101. Example components of the stereo vision system 120 and determining of the 3D pose is further discussed in detail below. Although the illustrated embodiment shows the stereo vision system 120 implemented on the transfer apparatus 200 operating in a Cartesian coordinate system, the stereo vision system 120 can be implemented on a different robotic transfer apparatus operating in a different coordinate system. Such robotic transfer apparatus can appropriately orient an item with their respective coordinate system based on the 3D pose information from the stereo vision system 120.

Figure 2:
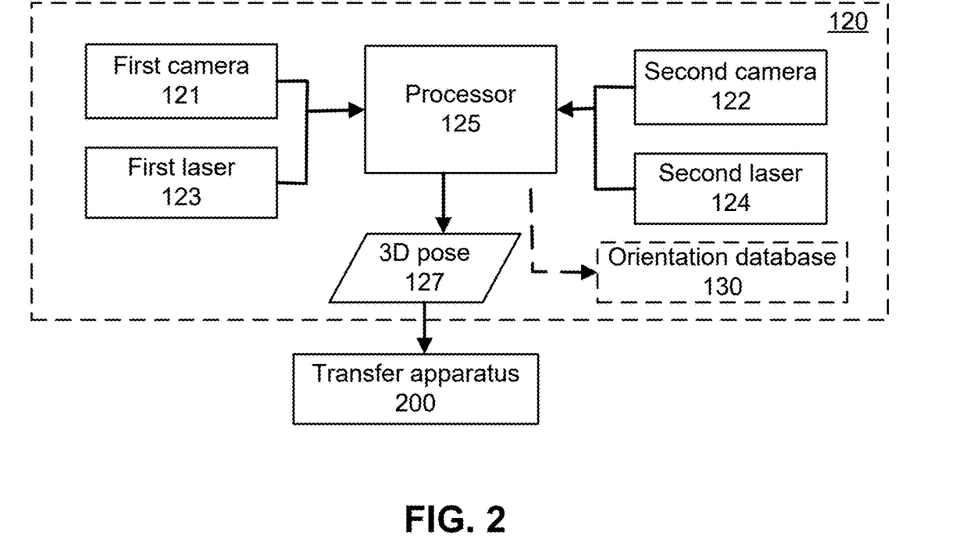
FIG. 2 is a block diagram of an example stereo vision system of FIG. 1.

FIG. 2 is a block diagram showing examples of components that may be utilized in the stereo vision system 120 for determining a 3D pose of an inventory holder. The stereo vision system 120 can include multiple cameras, multiple lasers, and one or more processors in communication with the cameras and the lasers. Each camera can be coordinated with a laser to capture an image of localized portions of the inventory holder. For example, a localized portion can be a portion of the inventory holder intersected by light of the laser. Based on these local images, intersection points where the laser light intersects the portion of the inventory holder can be extracted. These intersection points can be used to determine, via the one or more processors, a 3D pose of the inventory holder.

As shown in FIG. 2, the stereo vision system 120 can include a first camera 121, a first laser 123, a second camera 122, a second laser 124, and a processor 125. Each of the cameras 121, 122 can be in communication (e.g., wired or wirelessly) with the processor 125. The processor 125 can be configured to determine a 3D pose 127 of an inventory holder based on the information (e.g., localized images) received from the cameras 121, 122. In addition or alternatively, the laser 123 and 124 can be in communication with the processor 125 and provide information related to the laser such as light intensity, laser orientation with respect to the inventory holder, etc.

In many embodiments, the first camera 121, and the first laser 123 can cooperatively capture a first image localized to a first frame portion associated with a compartment (e.g., 105 in FIG. 1). For example, the first camera 121 can capture frame elements defining an opening of the specified compartment (e.g., a compartment 105 relative to which an item is to be extracted or inserted). Similarly, the second camera 122 and the second laser 124 can cooperatively capture a second image localized to a second frame portion associated with the same compartment. The cameras 121, 122 can be pre-oriented to capture different portions (e.g., a leftward portion and a rightward portion) of the same compartment of the inventory holder at the same time. For example, the cameras 121-122 comprises non-intersecting field of views. As such, images captured by the cameras 121-122 can distinguishable from each other. In other words, the cameras 121-122 do not capture images of the same portions from different angles and use such angle and differences in images as variables to solve for location information. Further, the processor 125 may be configured to determine the 3D pose of the inventory holder based on the first image and the second image.

In many embodiments, the first laser 123 can be oriented to cause light to intersect with a vertical portion and a horizontal portion of the first frame portion (e.g., leftward) associated with an opening of the specified compartment of the inventory holder. The second laser 124 can be oriented to cause light to intersect with a horizontal portion and a vertical portion of the second frame portion (e.g., rightward) associated with the opening of the same specified compartment.

In many embodiments, the first image captured by the first camera 121 can include a first laser line profile associated with the light from the first laser 123 intersecting the first frame portion. The second image captured by the second camera 122 can include a second laser line profile associated with the light from the second laser 124 intersecting the second frame portion.

In many embodiments, the processor 125 can be configured to determine a first location on the vertical portion and a second location on the horizontal portion of the first frame portion based on the first laser line profile. Furthermore, the processor 125 can be configured to determine a third location on the horizontal portion and a fourth location on the vertical portion of the second frame portion based on the second laser line profile. For example, each of the first, second, third, and fourth locations can be characterized by coordinates (x, y, z) with respect to a reference plane (e.g., such as any of those described further below with reference to FIG. 10). Based on the first location, the second location, the third location, and the fourth location, the processor 125 can determine the 3D pose of the inventory holder.

In some embodiments, the processor 125 can be configured to compare dimensional values of the second location and the third location (e.g., which may both be along a horizontal portion of the compartment) to determine level information of the 3D pose of the inventory holder. In another example, the processor 125 can also be configured to compare dimensional values of the third location and the fourth location (e.g., which may both be along the second frame portion of the compartment) to determine a depth information of the 3D pose of the inventory holder. In addition or alternatively, the processor 125 can be further configured to determine the 3D pose based on the first location, the second location, and the third location. The fourth location can be used to determine a confidence score of the determined 3D pose.

In addition or alternatively, the stereo vision system 120 can include an orientation database 130. The orientation database can be pre-populated with localized information collected for inventory holders in different orientations. For example, the orientation database 130 can include geometric patterns, images, laser line intensities, locations of light intersecting frame portions, or other data associated with portions of the inventory holder in different orientations. The processor 125 can be configured to determine a 3D pose of the inventory holder based on pattern matching based on the first location, the second location, the third location, and the fourth location with patterns in the orientation database 130. The present disclosure is not limited to pattern matching and other methods may be employed. For example, the locations can be determined by isolating segments of the laser line profiles, or detecting signal signature within the laser line profiles.

Figure 3:
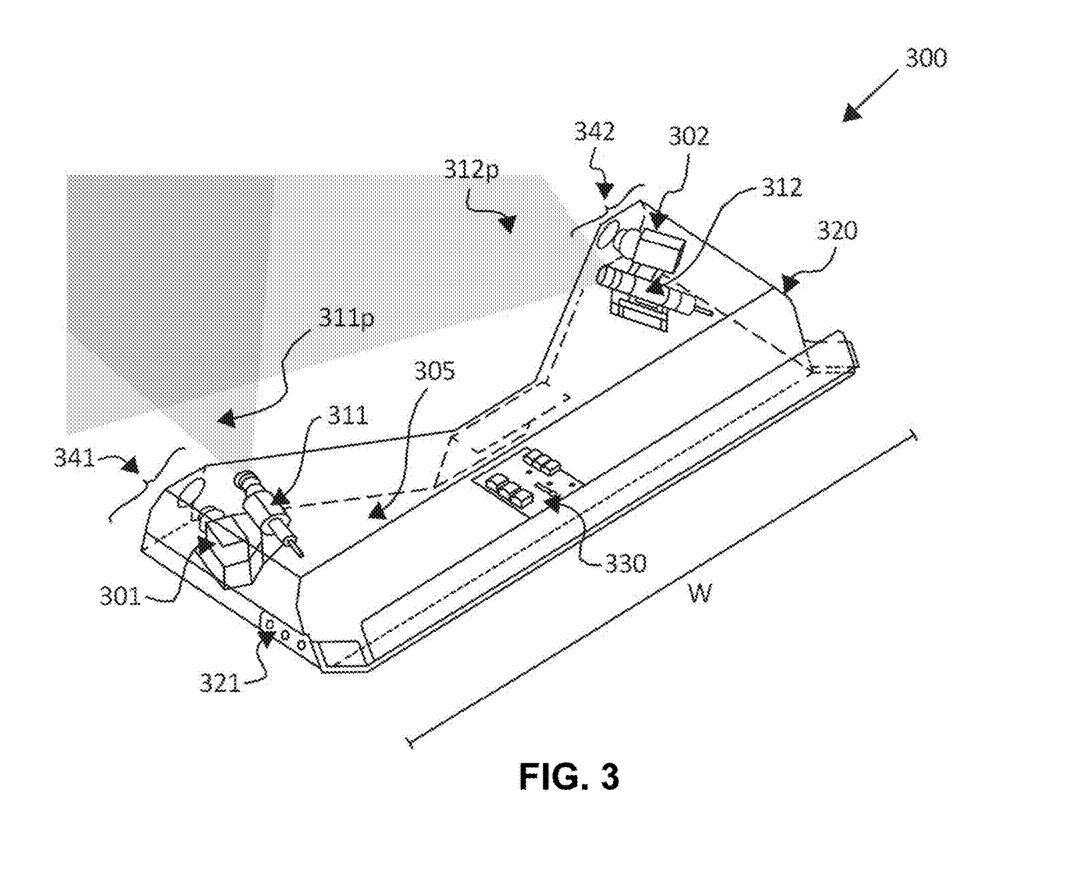
FIG. 3 illustrates an example stereo vision system for the inventory system of FIG. 1.

FIG. 3 illustrates a stereo vision system 300, which can be an example implementation of the stereo vision system 120.

Figure 4:
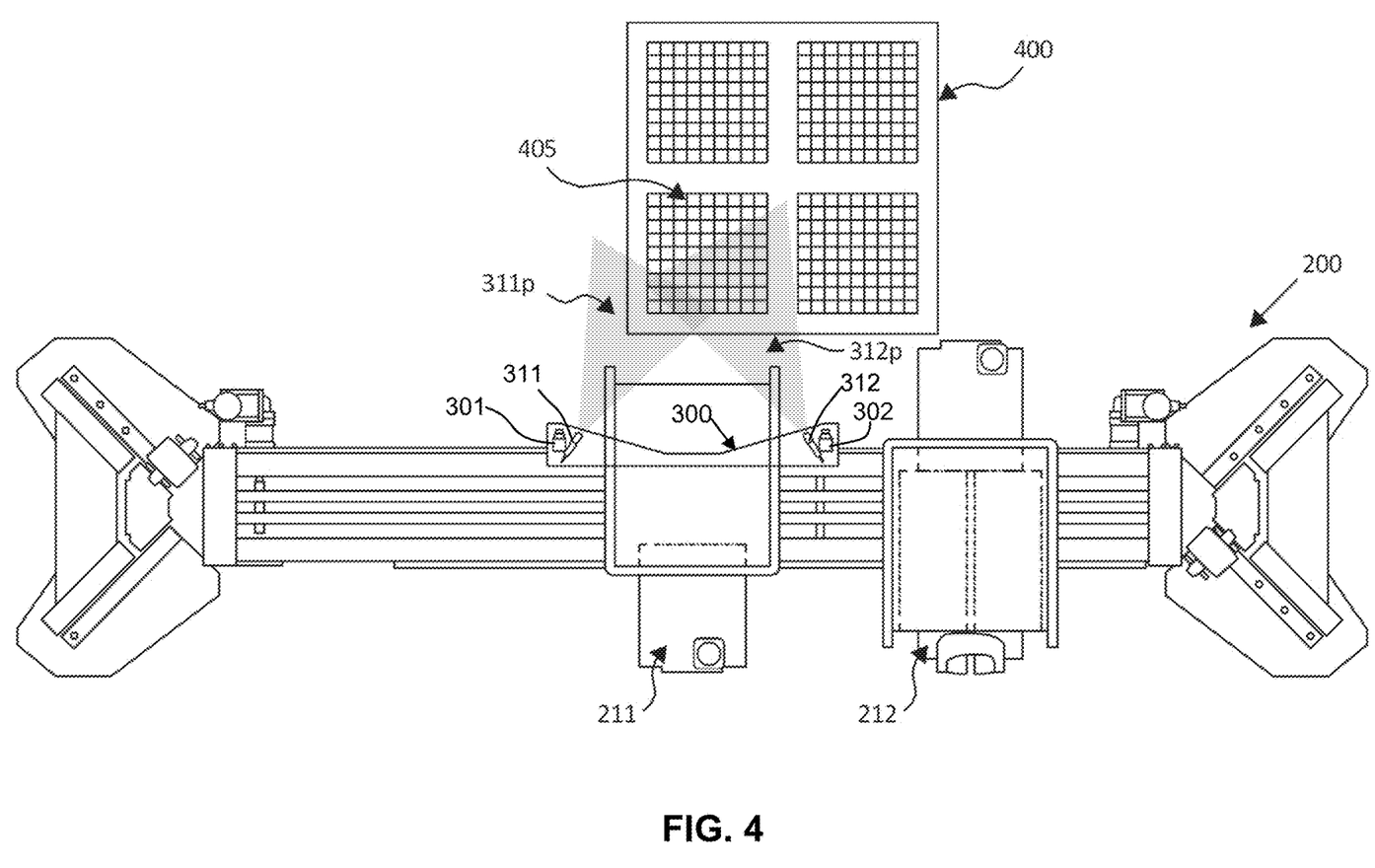
FIG. 4 illustrates a top view of stereo vision system of FIG. 3 localized with respect to the inventory system of FIG. 1.
Figure 5:
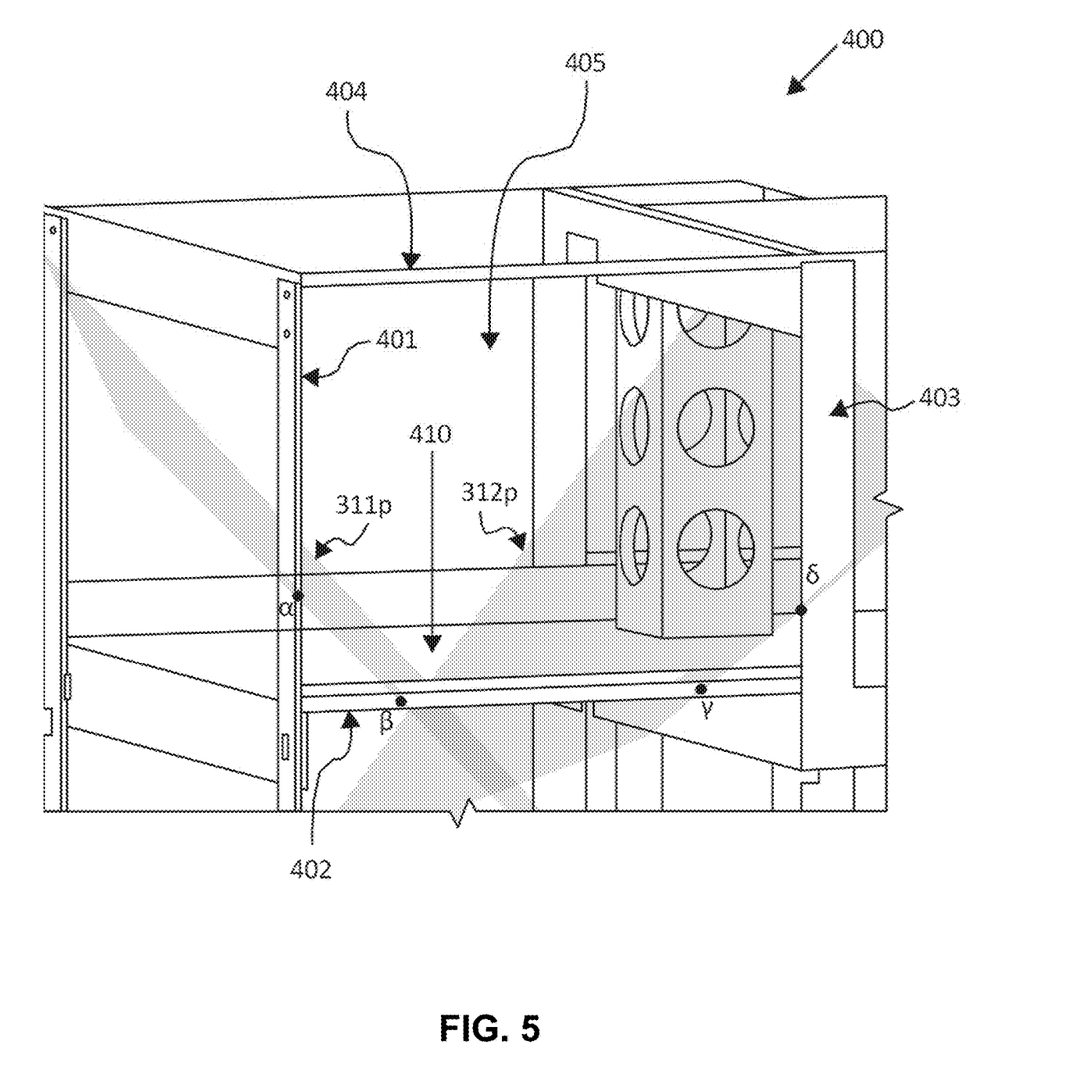
FIG. 5 illustrates example intersection points that the vision system of FIG. 3 creates with an opening of the inventory system of FIG. 1.

FIG. 4 and FIG. 5 illustrate an example implementation of the stereo vision system 300 in an inventory system environment to determine a 3D pose of an inventory holder 400 (which can be similar to the inventory holder 100). Referring to FIG. 3, the stereo vision system 300 can include cameras and lasers installed on a platform 340. One or more processors may also be installed on the platform 340 or otherwise suitably situated for wired or wireless communication with the cameras and lasers. The platform 340 can have a width W configured to span across all or a portion of the head 211 in FIG. 1 or other relevant portion of a transfer apparatus. The platform 340 can include a left end portion 341 and a right end portion 342 laterally spaced from the left end portion 341 along the width W. In some embodiment, the platform 340 can include a flat surface and/or may be shaped according to the geometry of other inventory system components (e.g., an inventory holder, and/or a transfer apparatus). In some embodiments, a cover 320 can be provided to cover components borne by the platform 340, such as the cameras, 301, 302, the lasers 311, 312, and/or the processor 330. The cover 320 can protect the components of the stereo vision system 300 from dust, water, or other pollutants that may be present in the inventory environment.

In the illustrated embodiment, the stereo vision system 300 can include a first camera 301, a second camera 302, a first laser 311, and a second laser 311. The first camera 301 and a first laser 302 can be disposed at the left end portion 341 of the platform 340. The second camera 302 and the second laser 312 can be disposed at the right end portion 432 of the platform 340. As illustrated, the second camera 302 can be laterally spaced from the first camera 301. The second camera 302 can be at a same level as the first camera 301. The second laser 312 can be laterally spaced from the first laser 311. The second laser 312 can be at a same level as the first laser 311. The first camera 301 and the first laser 311 can be in a first fixed orientation relative to the platform 340. The second camera 302 and the second laser 312 can be in a second fixed orientation relative to the platform 340. In some embodiments, each of the cameras 301, 302 and the lasers 311, 312 can be fixed relative to each other. When installed on the transfer apparatus (e.g., 200), the fixed orientation can indicate the cameras and the lasers are not movable relative to the platform 340 or other reference structure of the transfer apparatus.

In many embodiments, the first laser 311 can be configured to emit a first light plane 311$p$. The first light plane 311$p$ can have a triangular, sheet-like profile or other profile shapes. In some embodiments, the first laser 311 can emit light that appears as a line on a projected surface. Similarly, the second laser 312 can be configured to emit a second light plane 312$p$. The second light plane 312$p$ can have a triangular, sheet-like profile or other profile shapes. In some embodiments, the second laser 312 can emit light that appears as a line on a projected surface. The cameras 301 and 302 can respectively capture the line of light projected on the surface.

In some embodiments, calibration measurements to accurately determine the relative poses of the camera's and laser plane's orientations can be performed. After calibrating, for any given camera pixel there is a unique 3D point in space that the laser can reflect from to light up that pixel. Using the calibration data a 3D location can be calculated for all of the pixel that are lit up in an image captured by the camera.

Turning to FIG. 4 and FIG. 5, the first camera 301 and the first laser 311 can be localized (e.g., via the transfer apparatus 200) to capture a first image (e.g., a leftward image) of a leftward frame portion associated with a specified compartment 405 of the inventory holder 400. The right camera 302 and the right laser 312 can be localized to capture a second image (e.g., a rightward image) of a rightward frame portion of the frame associated with the specified compartment 405. The cameras 301, 302 may have intersecting field of views and the lasers 311, 312 may also emit light planes that are intersecting (at least partially). In this case, images can be captured by the cameras 301, 302 at different times. For example, sequentially turning on and off. For example, the first camera 301 and the first laser 311 turned on to capture a first image, followed by turning on the second camera 302 and the second laser 312 and turning off the first camera 301 and laser 311. As another example, an image processing method can be employed that can isolate the returns from only camera's corresponding laser. In other words, the cameras 301, 302 do not capture images of the same portions from different angles and use such angle and differences in images as variables to solve for location information.

For example, as shown in FIG. 5, the compartment 405 can be defined by frame elements 401, 402, 403, and 404, and a shelf 410 extending along a depth of the inventory holder. The frame elements 401-404 also define an opening of the compartment 405. The frame element 401 can be a leftward vertical frame portion, the frame element 402 can be a horizontal frame portion or a bottom frame portion, the frame element 403 can be a rightward vertical frame portion, and the frame element 404 can be another horizontal frame portion or a top frame portion. The stereo vision system 300 may be positioned to direct the first laser 311 such that the light plane 311$p$ intersects the element 401 and a leftward portion of the frame element 402 at intersection points α and β, respectively. Similarly, the second laser 312 may direct the light plane 312$p$ to intersect a rightward portion of the frame element 402 and the element 403 at intersection points γ and δ, respectively.

Figure 6:
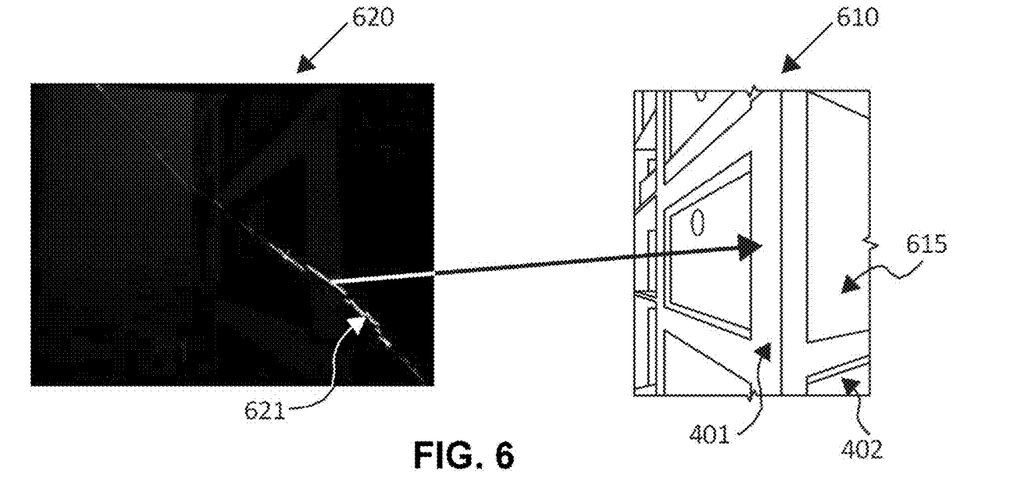
FIG. 6 illustrates views showing a frame portion associated with a specified opening (e.g., left side frame portion of the opening) in the inventory holder of FIG. 1, and a related image that may be associated with that frame portion.

FIG. 6 illustrates an example of a first image 620 captured by the first camera 301 of the leftward frame portions (e.g., including portions of the left vertical frame element 401 and the horizontal frame element 402). The first image 620 illustrates a laser line profile 621 corresponding to the first light plane 311$p$ intersecting the leftward frame portions 401, 402 of the compartment 405. Each point along the first line profile 621 can have a particular light intensity corresponding to the orientation of the leftward frame portions 401, 402. In some embodiments, the first image 620 can also include information or an image of the frame portions shown in image 610. In an example, the compartment 405 can include an item 615 stored therein. The laser light may or may not intersect the item 615.

Figure 8:
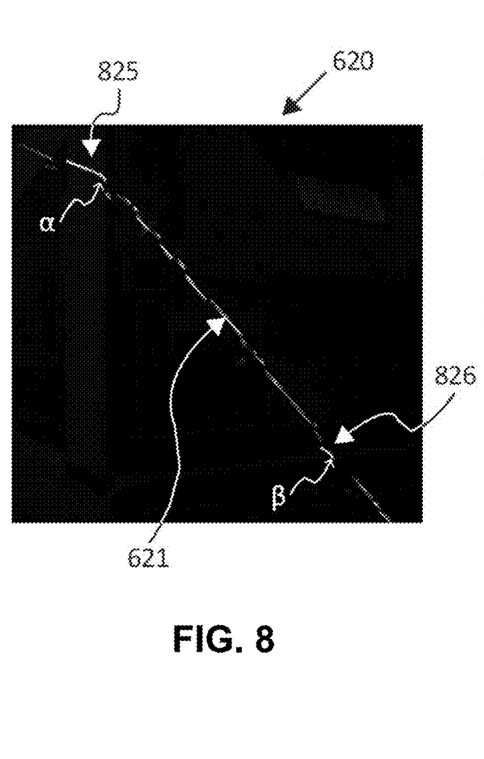
FIG. 8 illustrates intersection points extracted from the first image of FIG. 6.

Referring to FIG. 8, based on the information in the first image 620, a first portion 825 and a second portion 826 of the line profile 621 that intersects with the frame elements can be identified. Further, intersection point α on the leftward vertical frame portion (e.g., of the frame element 401) and β on the leftward horizontal frame portion (e.g., of the frame element 402) can be determined, as illustrated. For example, the intersection point can be the point on the portions 825, 826 that are closest to an opening of the compartment (e.g., 405).

Figure 7:
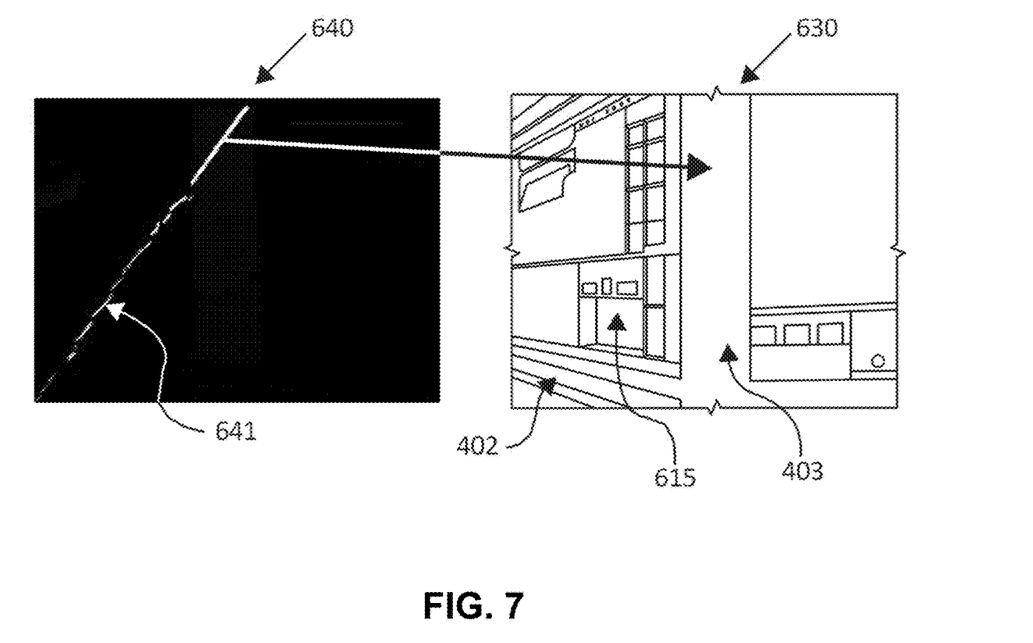
FIG. 7 illustrates views showing another frame portion associated with the specified opening (e.g., right side frame portion of the opening) in the inventory holder of FIG. 1, and a related image that may be associated with that frame portion.

FIG. 7 illustrates an example of a second image 640 captured by the second camera 302 of the rightward frame portions (e.g., including portions of the right vertical frame element 403 401 and the horizontal frame element 402). Similar to discussion with respect to FIG. 6 above, the second image 640 illustrates a laser line profile 641 corresponding to the second light plane 312$p$ intersecting the rightward frame portion of the compartment 405. Each point along the second line profile 641 can have a particular light intensity corresponding to the orientation of the rightward frame portions. The second image 640 can also include information or an image of the frame portions shown in the image 630.

Figure 9:
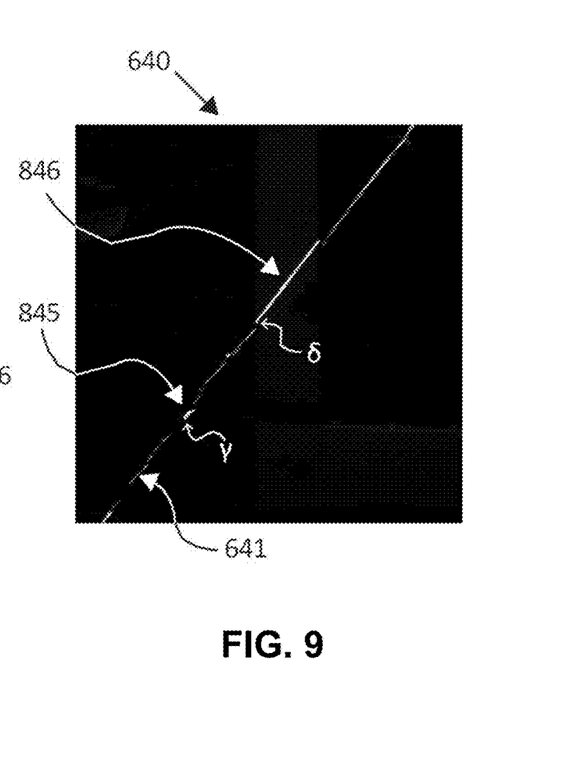
FIG. 9 illustrates intersection points extracted from the second image of FIG. 7.

Referring to FIG. 9, based on the information in the first image 640, a third portion 845 and a fourth portion 846 of the line profile 641 that intersects with the frame elements can be identified. Further, intersection points γ on the rightward horizontal frame portion (e.g., of the frame element 402) and 8 on the rightward vertical frame portion (e.g., of the frame element 403) can be determined, as illustrated in an image 640 of FIG. 9. For example, the intersection point can be the point on the portions 845, 846 that are closest to an opening of the compartment (e.g., 405).

Figure 10:
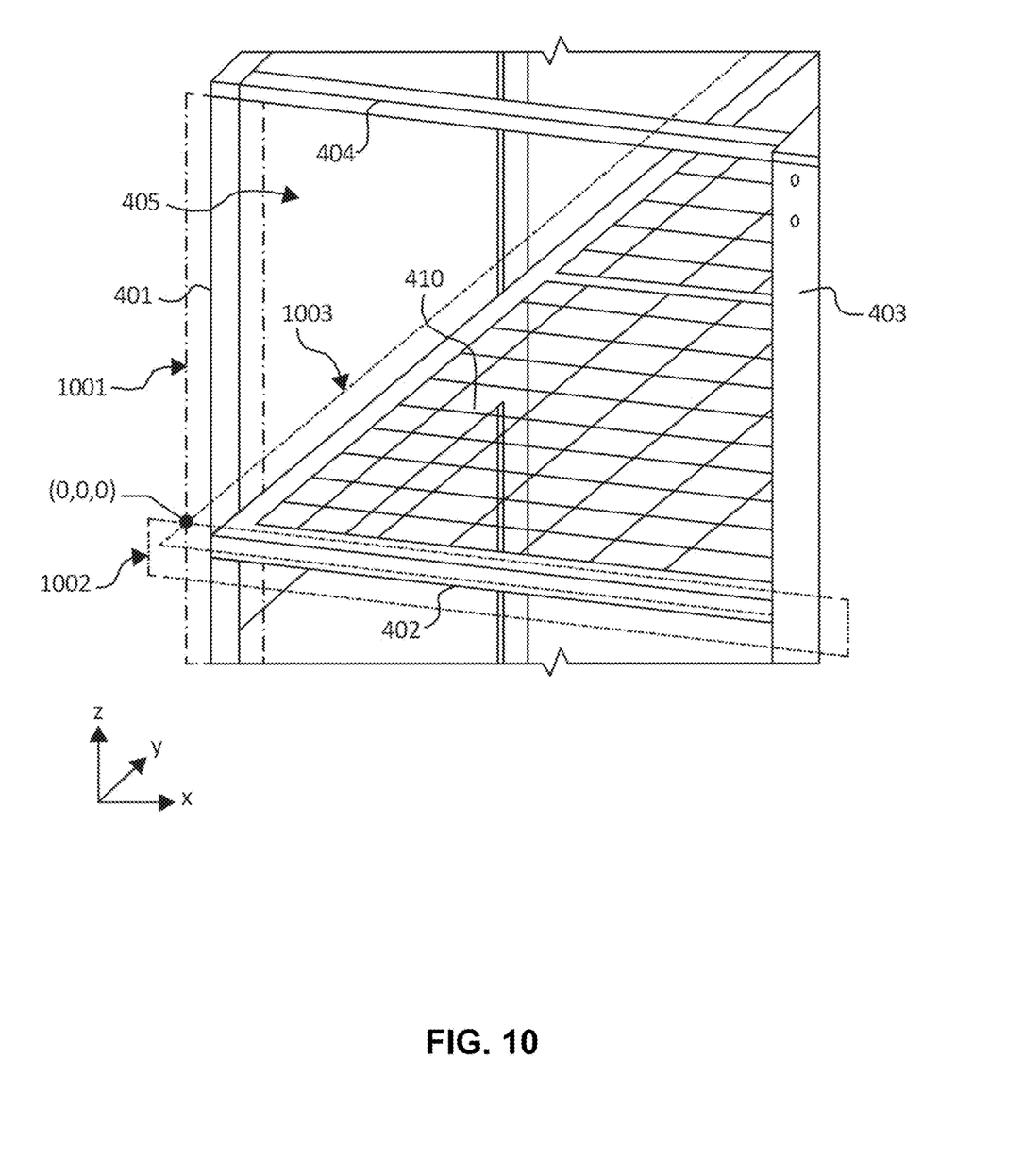
FIG. 10 illustrates example reference planes associated with the inventory holder of FIG. 1.

In some embodiments, intensity values associated with the intersection points α, β, γ, and δ can be assigned geometric values or dimensions (e.g., in x, y, z) with an origin (0, 0, 0) corresponding an intersection point of reference planes. For example, FIG. 10 illustrates reference planes 1001, 1002, and 1003 extending along x, y, and z direction. As shown, a first plane 1001 can be a vertical plane overlapping a face (e.g., a side face) of the frame element 401 and extend along the z-direction. A second plane 1002 can be a vertical plane overlapping a face (e.g., a front face) of the frame element 402 and extend along x-direction. A third plane 1003 can be a horizontal plane overlapping the shelf 410 (e.g., a bottom face) and extending along y-direction. Accordingly, the intersection points α, β, γ, and δ can correspond to a first location, a second location, a third location, and a fourth location, respectively, in a 3D space. Based on these locations, the 3D pose of the inventory holder 400 can be determined. In some embodiments, the 3D pose can be determined based on the first location, the second location, and the third location, while the fourth location can be used for confirmation of the orientation.

In some embodiments, dimensional values of the second location (e.g., β) and the third location (e.g., γ) can be compared to determine level information of the 3D pose of the inventory holder (e.g., 400). If the second location and the third location have coordinate values within a specified range or are equal, the inventory holder 400 may be considered horizontally levelled. For example, level information can be determined by comparing z values. If the second location and the third locations are different, then the inventory holder 400 may be not levelled. Accordingly, the transfer apparatus (e.g., 200) can be instructed to adjust a position of the head (e.g., 211) such that the item is relatively levelled with respect to the specified compartment (e.g., 405). In addition or alternatively, the head (e.g., 211) may just be operated to operate regardless of whether the item is leveled. For example, by grabbing the item at a different spot or pulling the item in a different path to ensure the item does not run into the frame during insertion/extraction in view of the information about the 3D pose of the inventory holder.

In some embodiments, dimensional values (e.g., y values) of two or more points can be compared to determine depth information. For example, dimensional values of the third location (e.g., γ) and the fourth location (e.g., δ) can be compared to determine a depth information of the 3D pose of the inventory holder. If the third location and the fourth location have coordinate values within a specified range or equal values, the inventory holder 400 may be aligned with a front face situated as anticipated (fully forward facing) and/or not angularly oriented. If the values are different, the inventory holder 400 may be angularly oriented (e.g., rotated with respect to the z-axis). For example, the frame element 401 or leftward frame element may have y-values different from the frame element 403 or the rightward portion. In this case, the transfer apparatus (e.g., 200) can be instructed to adjust the head (e.g., 211) at an angle such that a face of the item is relatively parallel to a face of the opening of the compartment (e.g., 405). Similarly, locations α and β, or α and δ, or other combinations can be used to determine depth information.

In some embodiments, the 3D pose may be determined based on three (e.g., α, β, and γ) out of four locations. The fourth location (e.g., δ) can be used determine a confidence score of the determined 3D pose. A confidence score can confirm whether the orientation is accurate, thus providing confidence in prediction of the 3D pose based on localized information associated with a portion (e.g., the compartment 405) of the inventory holder (e.g., 400).

Determining a 3D pose based on few points rather than processing an entire image can significantly improve the computing efficiency of the processor (e.g., 125 or 330). As such, the 3D pose information can be determined quickly before an item transfer without a need of additional steps (e.g., positioning the head at different heights, collecting sensor data, and determining an orientation of a head to exchange an item) performed by existing systems. Thus, the stereo vision system (e.g., 120, 300) discussed herein can facilitate faster, efficient, and smoother item transfer. In an inventory environment, such improvements may correspond to hundreds of thousands of item exchanges. Hence, throughput of the inventory system can be improved multiple fold.

Figure 11:
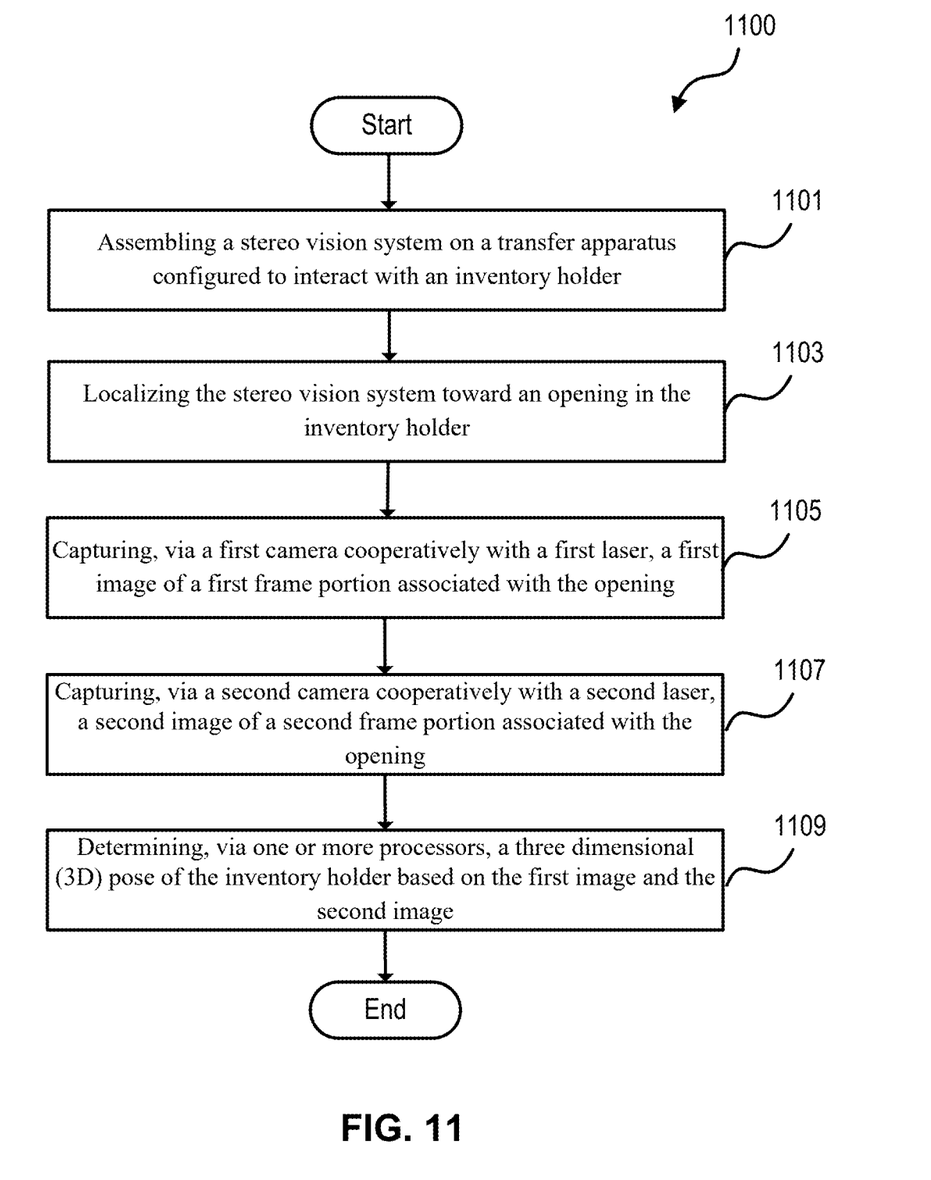
FIG. 11 is a flow chart of a method for determining a 3D pose of an inventory holder using a vision system of FIG. 2.

FIG. 11 is a flow chart of a method 1100 for determining a 3D pose of an inventory holder using a vision system (e.g., the stereo vision system 120 or 300). The method 1100 can include operations 1101, 1103, 1105, 1107, and 1109. The method 1100 can involve identifying specific locations of only a portion of the inventory holder to determine the 3D pose. Processing few locations to determine 3D pose can be significantly faster than processing an entire image of an inventory holder. The method can be performed just prior to extracting or inserting an item from the inventory holder.

Operation 1101 can involve assembling a stereo vision system on a transfer apparatus configured to interact with an inventory holder. For example, as shown in FIG. 1 and FIG. 4, the stereo vision system 300 can be assembled on the head 211 of the transfer apparatus 200. The stereo vision system can include multiple cameras, each camera coordinated with a laser. As discussed, the stereo vision system 300 can include the first camera 301, the second camera 302, the first laser 311, and the second laser 312. The second camera 302 and the second laser 312 can be laterally spaced from the first camera 301 and the first laser source 311.

Operation 1103 can involve localizing the stereo vision system toward an opening in the inventory holder. For example, localizing can refer to focusing the cameras 301, 302, and lasers 311, 312 to only a specified portion (e.g., the compartment 405) of the inventory holder (e.g., 400) so that the stereo vision system 300 captures information of a specified portion of the inventory holder (e.g., 400). The localization can be achieved via the transfer apparatus (e.g., 200), and orientations of the cameras 301, 302 and the lasers 311, 312. In other words, the cameras may be arranged to not capture images of an entire inventory holder. Localization to stereo vision system 300 can help capture appropriate details of only the specified compartment rather than capturing information of an entire inventory holder. Processing (e.g., via the processor 125) localized information to determine a 3D pose can be faster and more efficient than information of an entire inventory holder. This can in turn improve throughput of the inventory system (e.g., 100) as discussed herein.

Operation 1105 can involve capturing, via the first camera cooperating with the first laser, a first image of a first frame portion associated with the opening. Similarly, operation 1107 can involve capturing, via the second camera cooperating with the second laser, a second image of a second frame portion associated with the opening. This way, localized information associated with a particular defined area of focus (e.g., a specified compartment of the inventory holder) can be captured.

In many embodiments, capturing the first image can involve directing light from the first laser to intersect with a vertical portion and a horizontal portion of the first frame portion associated with the opening to generate a first laser line profile associated with the first frame portion. For example, as discussed with reference to FIG. 5 and FIG. 6, the light 311p from the first laser 311 can be directed to intersect the vertical frame element 401 and a leftward portion of the horizontal frame element 402 to generate a line profile 621. Similarly, capturing the second image can involve directing light from the second laser to intersect with a horizontal portion and a vertical portion of the second frame portion associated with the opening to generate a second laser line profile associated with the second frame portion. For example, as discussed with reference to FIG. 5 and FIG. 7, the light 312p from the second laser 312 can be directed to intersect a rightward portion of the horizontal frame element 402 and the vertical frame element 403 to generate a line profile 641.

Operation 1109 can involve determining, via one or more processors, a three dimensional (3D) pose of the inventory holder based on the first image and the second image. In many embodiments, determining the 3D pose can involve determining, based on the first laser line profile, a first location on the vertical portion and a second location on the horizontal portion of the first frame portion. Similarly, based on the second laser line profile, a third location on the horizontal portion and a fourth location on the vertical portion of the second frame portion can be determined. For example, as shown in FIGS. 8 and 9, the first location $\alpha$ and the second location $\beta$ can be determined based on the first line profile 621, and the third location $\gamma$ and the fourth location $\delta$ can be determined based on the second line profile 641. As discussed herein, the locations $\alpha$, $\beta$, $\gamma$, and $\delta$ can be points of intersection of the light from the lasers 311, 312 with the frame portion of the compartment 405 (see FIG. 5).

In some embodiments, determining the 3D pose can involve pattern matching based on the first location, the second location, the third location, and the fourth location with patterns in an inventory holder orientation database. For example, as discussed with respect to FIG. 2, the processor 125 can be compare the locations $\alpha$, $\beta$, $\gamma$, and $\delta$ with locations stored in the orientation database 130.

In some embodiments, the method 1100 can further involve mapping the first location, the second location, the third location, and the fourth location on a first plane extending along either a front face of a frame element (e.g., a vertical frame of the first frame portion), a second plane extending along a front face of another frame element (e.g., the horizontal frame of the first frame portion), and a third plane extending along a side face or bottom base (e.g., along a depth of a shelf) of the inventory holder, wherein the first, second, third planes provide reference datum during inserting and picking up an item from the inventory holder. For example, as shown in FIG. 10, the planes 1001, 1002, and 103 can be the reference datum. Based on the locations $\alpha$, $\beta$, $\gamma$, and $\delta$ with respect to the reference datum, a face of the item can be oriented via the transfer apparatus (e.g., 200) approximately parallel to the opening of the compartment (e.g., 405) so that the item can be inserted and/or extracted with negligible interference with the inventory holder.

In some embodiments, the method 1100 can further involve comparing dimensional values of the second location and the third location to determine level information of the 3D pose of the inventory holder. For example, referring to FIG. 5, FIG. 8 and FIG. 9, if the locations $\beta$ and $\gamma$ have intensity values or z values that match within a predetermined range, these locations can be at a same level. In other words, the inventory holder 400 can be horizontally levelled. In some embodiments, the method 1100 can further involve comparing dimensional values of the third location and the fourth location to determine a depth information of the 3D pose of the inventory holder. For example, referring to FIG. 9, if the third location $\gamma$ has an intensity value greater than the fourth location $\delta$ or vice versa, it can indicate the inventory holder is angularly oriented about the z-axis.

In some embodiments, the method 1100 can involve determining the 3D pose based on the first location, the second location, and the third location. The fourth location can be used to determine a confidence score of the determined 3D pose. For example, the 3D pose can indicate the inventory holder is angularly oriented. Then, the third and fourth locations can be compared to confirm the orientation. For example, if values at the third location are different (e.g., greater or smaller) than the fourth location in intensity or other relevant parameter (such as depth) it can confirm that the inventory holder is angularly oriented.

In various embodiments, the inventory holder 101 (e.g., in FIG. 1) can store inventory items of the inventory system 100. For example, the inventory holder 101 may correspond to a dense tote pod. A dense tote pod may include spaces of approximately equal sizes to receive multiple totes or storage bins. Each space can be sized to receive a tote capable of holding one or more types of inventory items. The inventory holders 101 can include one or more spaces 102 (e.g., cubbies, shelves, slots, etc.) that can receive one or more types of inventory items (e.g., a tote). The inventory holders 101 may include items within totes, boxes, bags, or other forms of containers.

The inventory items may represent any objects suitable for storage, retrieval, and/or processing in the inventory system 100. For example, inventory items may be totes or storage bins. The inventory items may include one or more objects of a particular type that are stored in a tote or a storage bin of the inventory system 100. In further embodiments, a particular inventory holder 101 can store a particular inventory item if the inventory holder 101 currently holds one or more of the same item type.

In various embodiments, a partition screen (not shown) may be positioned between the transfer apparatus 200 and the workstation 110. The partition screen may serve as a safety barrier between the inventory holders 101, the transfer apparatus 200, and an operator at the workstation 110. The inventory system 100 may be arranged so that the operators do not have direct access to the inventory holders 101, rather the transfer apparatus 200 transfers items to/from the operator at an ergonomic and/or comfortable level (e.g., waist level). As such, the transfer apparatus 200 may facilitate ergonomic handling of the items. For example, the inventory system 100 may be arranged so that an operator does not have to climb a ladder and retrieve/deliver items from/to inventory holder 101, bend down to pick up items, carry items while on a ladder, or engage in other undesirable item handling operations.

Turning to a particular example, the inventory system 100 can represent a mail-order or other order-fulfillment warehouse facility, and inventory items can represent merchandise stored in the warehouse facility. During operation, a mobile drive unit 150 can carry an inventory holder 101 comprising one or more inventory items that are requested in an order to be packed for delivery to a customer. Alternatively or additionally, the inventory holder 101 may contain aggregated collections of inventory items for shipment. Moreover, in particular embodiments of the inventory system 100, boxes containing completed orders may themselves represent inventory items.

In various embodiments, components (e.g., the head, the lateral frame, the cameras, the and the lasers) of the inventory system 100 can communicate using IEEE 802.11, Bluetooth, or Infrared Data Association (IrDA) standards, or any other appropriate wireless or wired communication protocol. Additionally or alternatively, the inventory system 100 can include tracks or other guidance elements upon which the mobile drive units 150 can be wired to facilitate communication between the mobile drive units 150 used to move the inventory holders 101. In general, the mobile drive units 150 for moving the inventory holders 101 can be powered, propelled, and controlled in any manner appropriate based on the configuration and characteristics of the inventory system 100.

Some or all of the process 1100 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Based on the disclosure and teachings provided herein, a person of ordinary skill in the art will appreciate other ways and/or methods to implement the various embodiments. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of A, B, or C," unless specifically stated otherwise, is intended to be understood within the context as used in general to present that an item, term, etc., may be either A, B, or C, or any combination thereof (e.g., A, B, and/or C). Thus, such disjunctive language is not generally intended to, and should not, imply that certain embodiments require at least one of A, at least one of B, or at least one of C to each be present.

What is claimed is:

1. An inventory management system comprising:
   an inventory holder comprising a frame with a plurality of compartments for storing items therein;
   a robotic transfer apparatus configured to transfer the items into or out of the compartments; and
   a stereo vision system disposed on the robotic transfer apparatus and configured to determine a three dimensional (3D) pose of the inventory holder, the stereo vision system comprising:
   a platform comprising a left end portion and a right end portion laterally spaced from the left end portion;
   a left camera and a left laser disposed at the left end portion of the platform, the left camera and the left laser being localized to capture a leftward image of a leftward frame portion of the frame associated with a specified compartment of the plurality of compartments; and
   a right camera and a right laser disposed at the right end portion of the platform, the right camera and the right laser being localized to capture a right image of a rightward frame portion of the frame associated with the specified compartment; and
   one or more processors configured to determine the 3D pose of the inventory holder based on the leftward image and the rightward image.

2. The inventory management system of claim 1, wherein:
   the leftward image comprises a leftward laser line profile associated with the light from the left laser; and
   the rightward image comprises a rightward laser line profile associated with the light from the right laser.

3. The inventory management system of claim 2, wherein the one or more processors is configured to:
   determine, based on the leftward laser line profile, a first location on a left upright portion and a second location on a bottom crossbar of the leftward frame portion; and
   determine, based on the rightward laser line profile, a third location on the bottom crossbar and a fourth location on a right upright portion of the right frame portion.

4. The inventory management system of claim 3, wherein the one or more processors is configured to determine, based on the first location, the second location, the third location, and the fourth location, the 3D pose of the inventory holder.

5. The inventory management system of claim 1, wherein the robotic transfer apparatus comprises a head configured to translate and rotate in a cartesian coordinate system to align the head with the specified compartment, and wherein the stereo vision system is coupled to the head and configured to determine the 3D pose of the inventory holder in a single position of the head relative to the specified compartment.

6. A stereo vision system for determining a three dimensional (3D) pose of an inventory holder, the inventory holder comprising a frame with a plurality of openings, the stereo vision system comprising:
a first camera and a first laser configured to cooperatively capture a first image localized to a first frame portion associated with a specified opening of the plurality of openings;
a second camera and a second laser configured to cooperatively capture a second image localized to a second frame portion associated with the specified opening; and
one or more processors configured to determine the 3D pose of the inventory holder based on the first image and the second image.

7. The stereo vision system of claim 6, wherein:
the first laser is oriented to cause light to intersect with a vertical portion and a horizontal portion of the first frame portion associated with the specified opening; and
the second laser is oriented to cause light to intersect with a horizontal portion and a vertical portion of the second frame portion associated with the specified opening.

8. The stereo vision system of claim 7, wherein:
the first image comprises a first laser line profile associated with the light from the first laser intersecting the first frame portion; and
the second image comprises a second laser line profile associated with the light from the second laser intersecting the second frame portion.

9. The stereo vision system of claim 8, wherein the one or more processors is configured to:
determine, based on the first laser line profile, a first location on the vertical portion and a second location on the horizontal portion of the first frame portion; and
determine, based on the second laser line profile, a third location on the horizontal portion and a fourth location on the vertical portion of the second frame portion.

10. The stereo vision system of claim 9, wherein the one or more processors is configured to determine, based on the first location, the second location, the third location, and the fourth location, the 3D pose of the inventory holder.

11. The stereo vision system of claim 6, wherein the first camera and the first laser are fixed in a first predetermined orientation relative to each other, and the second camera and the second laser are fixed in a second predetermined orientation relative to each other.

12. The inventory management system of claim 6, wherein the first camera, the first laser, the second camera, and the second laser are in a fixed predetermined orientation relative to each other.

13. The stereo vision system of claim 6, wherein the second camera is laterally spaced from the first camera and at a same level as the first camera;
wherein and the second laser is laterally spaced from the first laser and at a same level as the first laser.

14. A method of determining three dimensional poses of an inventory holder, the method comprising:
accessing a stereo vision system mounted on a transfer apparatus configured to interact with the inventory holder, the stereo vision system comprising a first camera and a first laser source, and a second camera and a second laser source laterally spaced from the first camera and the first laser source;
localizing the stereo vision system toward an opening in the inventory holder;
capturing, via the first camera cooperating with the first laser, a first image of a first frame portion associated with the opening;
capturing, via the second camera cooperating with the second laser, a second image of a second frame portion associated with the opening; and
determining, via one or more processors, a three dimensional (3D) pose of the inventory holder based on the first image and the second image.

15. The method of claim 14, wherein capturing the first image and the second image comprises:
directing light from the first laser to intersect with a vertical portion and a horizontal portion of the first frame portion associated with the opening to generate a first laser line profile associated with the first frame portion; and
directing light from the second laser to intersect with a horizontal portion and a vertical portion of the second frame portion associated with the opening to generate a second laser line profile associated with the second frame portion.

16. The method of claim 15, wherein determining the 3D pose comprises:
determining, based on the first laser line profile, a first location on the vertical portion and a second location on the horizontal portion of the first frame portion; and
determining, based on the second laser line profile, a third location on the horizontal portion and a fourth location on the vertical portion of the second frame portion.

17. The method of claim 16, wherein determining the 3D pose comprises:
pattern matching, isolating segments of the laser line profiles, or detecting signal signature based on the first location, the second location, the third location, and the fourth location with patterns in an inventory holder orientation database.

18. The method of claim 17, further comprising:
mapping the first location, the second location, the third location, and the fourth location on a first plane extending along a lateral side of a vertical frame of the first frame portion, a second plane extending along a front face of the horizontal frame of the first frame portion, and a third plane extending along a depth of a shelf of the inventory holder, wherein the first, second, third planes provide reference datum during inserting and picking up an item from the inventory holder.

19. The method of claim 18, further comprising:
comparing dimensional values of the second location and the third location to determine level information of the 3D pose of the inventory holder; or
comparing dimensional values of the third location and the fourth location to determine a depth information of the 3D pose of the inventory holder.

20. The method of claim 18, further comprising:
determining the 3D pose based on the first location, the second location, and the third location; and using the fourth location to determine a confidence score of the determined 3D pose.

* * * * *